United States Patent
Pouran Ben Veyseh et al.

(10) Patent No.: US 11,886,825 B2
(45) Date of Patent: Jan. 30, 2024

(54) ASPECT-BASED SENTIMENT ANALYSIS

(71) Applicant: ADOBE INC., San Jose, CA (US)

(72) Inventors: Amir Pouran Ben Veyseh, Eugene, OR (US); Franck Dernoncourt, San Jose, CA (US)

(73) Assignee: ADOBE, INC., San Jose, CA (US)

( * ) Notice: Subject to any disclaimer, the term of this patent is extended or adjusted under 35 U.S.C. 154(b) by 503 days.

(21) Appl. No.: 17/218,490

(22) Filed: Mar. 31, 2021

(65) Prior Publication Data

US 2022/0318520 A1 Oct. 6, 2022

(51) Int. Cl.
*G06F 40/00* (2020.01)
*G06F 40/40* (2020.01)
(Continued)

(52) U.S. Cl.
CPC .............. *G06F 40/40* (2020.01); *G06F 18/22* (2023.01); *G06F 18/251* (2023.01); *G06F 18/29* (2023.01); *G06N 3/048* (2023.01); *G06N 3/08* (2013.01)

(58) Field of Classification Search
CPC ...... G06N 3/045; G06N 3/0464; G06N 3/047; G06N 3/048; G06N 3/0499; G06N 3/02; G06N 3/04; G06N 3/0442; G06N 3/044; G06N 3/08; G06N 20/00; G06N 20/20; G06N 3/096; G06N 3/042; G06F 40/30; G06F 40/211; G06F 40/40; G06F 40/284; G06F 40/10; G06F 40/00; G06F 40/20; G06F 40/205; G06F 40/242; G06F 40/237; G06F 40/247; G06F 40/253; G06F 40/268; G06F 40/289; G06F 40/295; G06F 16/3344; G06F 18/29; G06F 18/22; G06F 16/9035; G06F 18/285; G06F 18/24; G06F 18/2413; G06F 18/24147; G06F 18/213; G06F 18/295; G06F 16/3346; G06F 16/3347; G06F 16/35; G06F 16/36;
(Continued)

(56) References Cited

U.S. PATENT DOCUMENTS 11,386,273 B2 * 7/2022 Misra .................... G06F 40/247
2018/0032508 A1 * 2/2018 Matskevich ............ G06F 40/30
(Continued)

OTHER PUBLICATIONS

Zhang, C., Li, Q., & Song, D. (2019). Aspect-based sentiment classification with aspect-specific graph convolutional networks. arXiv preprint arXiv:1909.03477 (Year: 2019).*
(Continued)

*Primary Examiner* — Edgar X Guerra-Erazo
(74) *Attorney, Agent, or Firm* — F. CHAU & ASSOCIATES, LLC

(57) ABSTRACT

Systems and methods for natural language processing are described. One or more embodiments of the present disclosure generate a word embedding for each word of an input phrase, wherein the input phrase indicates a sentiment toward an aspect term, compute a gate vector based on the aspect term, identify a dependency tree representing relations between words of the input phrase, generate a representation vector based on the dependency tree and the word embedding using a graph convolution network, wherein the gate vector is applied to a layer of the graph convolution network, and generate a probability distribution over a plurality of sentiments based on the representation vector.

20 Claims, 9 Drawing Sheets

(51) Int. Cl.
*G06N 3/08* (2023.01)
*G06F 18/22* (2023.01)
*G06F 18/20* (2023.01)
*G06F 18/25* (2023.01)
*G06N 3/048* (2023.01)

(58) Field of Classification Search
CPC .... G06F 16/367; G06F 16/374; G06F 16/906; G06F 18/00; G06F 18/253; G06F 18/251
See application file for complete search history.

(56) References Cited

U.S. PATENT DOCUMENTS

2019/0005027 A1* 1/2019 He .................... G06F 40/30
2020/0342059 A1* 10/2020 Ziuzin ............... G06F 40/211

OTHER PUBLICATIONS

Zhang, Y., Qi, P., & Manning, C. D. (2018). Graph convolution over pruned dependency trees improves relation extraction. arXiv preprint arXiv:1809.10185. (Year: 2018).*

Yao, L., Mao, C., & Luo, Y. (Jul. 2019). Graph convolutional networks for text classification. In Proceedings of the AAAI conference on artificial intelligence (vol. 33, No. 01, pp. 7370-7377). (Year: 2019).*

1Veyseh, et al., "Improving Aspect-based Sentiment Analysis with Gated Graph Convolutional Networks and Syntax-based Regulation", In arXiv preprint arXiv preprint arXiv:2010.13389v1 [cs.CL] Oct. 26, 2020, 6 pages.

* cited by examiner

ASPECT-BASED SENTIMENT ANALYSIS

BACKGROUND

The following relates generally to natural language processing, and more specifically to sentiment analysis.

Natural language processing (NLP) refers to techniques for using computers to interpret natural language (i.e., language as spoken by humans). In some cases, NLP tasks involve assigning annotation data such as grammatical information to words or phrases within a natural language expression. A variety of machine learning algorithms have been applied to NLP tasks.

Sentiment analysis is an NLP task that involves predicting sentiment polarity (e.g., positive or negative feelings) reflected by an input sentence towards a specific aspect (e.g., an aspect term) identified in the input sentence. Sentiment analysis systems have used machine learning models to compute feature vectors for sentiment prediction.

However, conventional sentiment analysis systems sometimes fail to accurately predict the sentiment of a complex sentences. For example, when a sentence has a positive sentiment toward one term, and a negative sentiment toward another term, conventional sentiment analysis systems can make inaccurate predictions. Therefore, there is a need in the art for improved sentiment analysis systems that can accurately predict sentiment toward a particular aspect term in a complex sentence.

SUMMARY

The present disclosure describes systems and methods for natural language processing. One or more embodiments of the disclosure provide a sentiment analysis apparatus trained to generate a probability distribution over a set of sentiments toward an aspect term. Gate vectors based on the aspect term are applied to layers of a graph convolution network (GCN) to generate a representation of the input that is used for generation of the probability distribution. Accordingly, users can predict the sentiment of an input phrase toward the aspect term based on the probability distribution.

A method, apparatus, and non-transitory computer readable medium for natural language processing are described. One or more embodiments of the method, apparatus, and non-transitory computer readable medium include generating a word embedding for each word of an input phrase, wherein the input phrase indicates a sentiment toward an aspect term, computing a gate vector based on the aspect term, identifying a dependency tree representing relations between words of the input phrase, generating a representation vector based on the dependency tree and the word embedding using a graph convolution network, wherein the gate vector is applied to a layer of the graph convolution network, and generating a probability distribution over a plurality of sentiments based on the representation vector.

An apparatus and method for natural language processing are described. One or more embodiments of the apparatus and method include a dependency component configured to generate a dependency tree for an input phrase, a graph convolution network configured to generate a representation vector for the input phrase based on the dependency tree, wherein the representation vector is generated by applying a gate vector representing an aspect term of the input phrase to a layer of the graph convolution network, and a decoder network configured to generate a probability distribution over a plurality of sentiments toward the aspect term based on the representation vector.

A method, apparatus, and non-transitory computer readable medium for training a neural network are described. One or more embodiments of the method, apparatus, and non-transitory computer readable medium include identifying a training set comprising an input phrase, an aspect term, a dependency tree, and a ground truth sentiment of the input phrase toward the aspect term, generating a gate vector based on the aspect term, generating a representation vector for the input phrase based on the dependency tree by applying the gate vector to a layer of a graph convolution network, generating a probability distribution over a plurality of sentiments based on the representation vector, computing a multi-task loss function including a prediction loss based on comparing the ground truth sentiment with the probability distribution over the plurality of sentiments, and training the graph convolution network based on the multi-task loss function.

DETAILED DESCRIPTION

Figure 1:
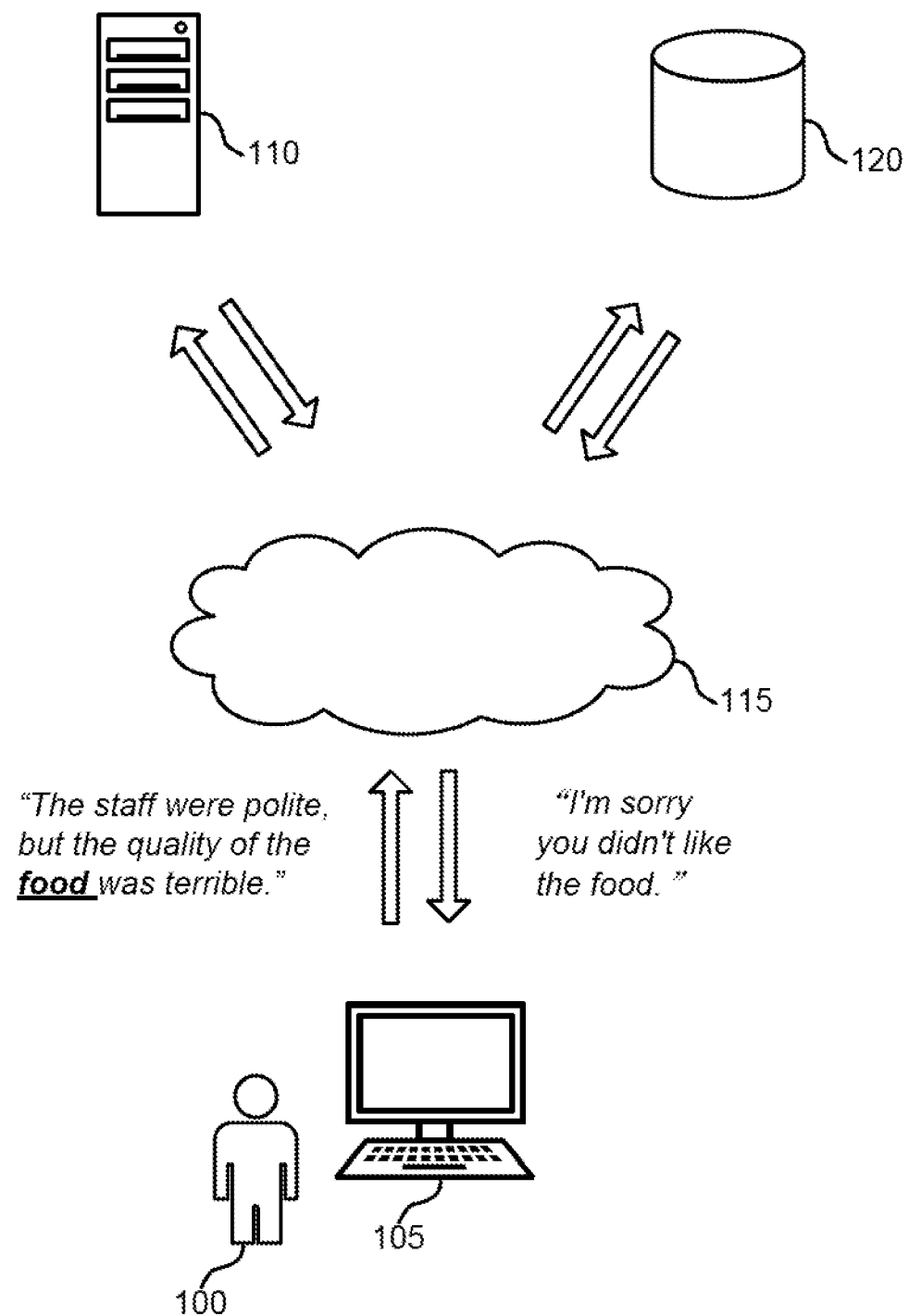
FIG. 1 shows an example of a dialog system according to aspects of the present disclosure.

The present disclosure describes systems and methods for natural language processing. One or more embodiments of the disclosure provide a sentiment analysis apparatus trained to generate a probability distribution over a set of sentiments toward an aspect term. Gate vectors based on the aspect term are applied to layers of a graph convolution network (GCN) to generate a representation of the input that is used for generation of the probability distribution. Accordingly, users can predict the sentiment of an input phrase toward the aspect term based on the probability distribution.

Some sentiment analysis systems use graph-based models to perform sentiment prediction. However, these graph-based models are not customized for the aspect terms. As a result, representation vectors produced from these graph-based models include irrelevant or inaccurate information for sentiment analysis, leading to decreased performance. Furthermore, graph-based learning models do not exploit the overall importance of the words in the sentences that may be estimated from dependency trees. As a result, conventional sentiment analysis systems provide inaccurate results when given complex sentences as input (e.g., sentences that include many irrelevant terms, or different sentiments toward different aspects terms).

One or more embodiments of the present disclosure provide a sentiment analysis apparatus that provides accurate sentiment analysis for complex inputs. For example, embodiments can provide accurate sentiment analysis for sentences that include many irrelevant terms, or different sentiments toward different aspects terms.

By applying the unconventional step of generating gate vectors based on the aspect term and applying the gate vectors to layers of a GCN, embodiments of the present disclosure reduce the impact of irrelevant and misleading terms, which improves the overall accuracy of the predictions. In some embodiments, a multi-task loss function is used to train the sentiment analysis network. The loss function can include a prediction loss that ensures accuracy, a divergence loss that ensures diversity among the gate vectors, and a consistency loss that ensures consistency between syntax-based and model-based importance scores. For example, the consistency loss is based on a syntax-based importance score and a model-based importance score for each word of the input text.

Embodiments of the present disclosure may be used in the context of a computer dialog application. For example, a sentiment analysis network based on the present disclosure may be used to generate a probability distribution over a set of sentiments, where the sentiment of the input phrase toward the aspect term can be predicted based on the probability distribution. Then a dialog response may be generated based on the sentiment analysis. An example application of the inventive concept in the computer dialog context is provided with reference to FIGS. 1 and 2. Details regarding the architecture of an example sentiment analysis apparatus are provided with reference to FIGS. 3, 4 and 5. Examples of a process for sentiment analysis are provided with reference to FIGS. 6 and 7. A description of an example training process is described with reference to FIGS. 8 and 9.

Computer Dialog Application

FIG. 1 shows an example of a dialog system according to aspects of the present disclosure. The example shown includes user 100, user device 105, sentiment analysis apparatus 110, cloud 115, and database 120. The dialog system of FIG. 1 shows an example where a computer system provides a response to a natural language expression related to a customer review of a restaurant.

In the example of FIG. 1, the user 100 provide a query to the sentiment analysis apparatus 110, e.g., via the user device 105 and the cloud 115. The example query is "The staff were polite, but the quality of the food was terrible." In this example, "food" may be recognized as an aspect term. The sentiment analysis apparatus 110 determines that the query (i.e., input phrase) indicates a negative sentiment toward the aspect term, and the dialog system responds accordingly.

The sentiment analysis apparatus 110 includes a trained sentiment analysis network having a word embedding network that generates word embeddings for each word of the query. The sentiment analysis network also computes gate vectors based on the aspect term ("food"). Additionally, the sentiment analysis network identifies a dependency tree representing relations between words of the input phrase, and then generates a representation vector based on the dependency tree and the word embedding (e.g., using a GCN).

Based on the output of the GCN, the sentiment analysis apparatus 110 generates a probability distribution over a set of sentiments. For example, the set of sentiments may include positive sentiment, negative sentiment, and neutral sentiment. In the example above, the sentiment analysis apparatus 110 predicts the sentiment of the query (i.e., input phrase) toward the aspect term ("food") based on the probability distribution. The sentiment analysis apparatus 110 returns the predicted answer to the user 100, e.g., via the user device 105 and the cloud 115. One example answer is "I'm sorry you didn't like the food", based on the negative sentiment towards the food.

The user device 105 may be a personal computer, laptop computer, mainframe computer, palmtop computer, personal assistant, mobile device, or any other suitable processing apparatus. In some examples, the user device 105 includes software that incorporates a sentiment analysis or a question answering application (e.g., a dialog system). The question answering application may either include or communicate with the sentiment analysis apparatus 110.

The sentiment analysis apparatus 110 includes a computer implemented network comprising a dependency component, a graph convolution network, a decoder network, and a word embedding network. The network generates a word embedding for each word of an input phrase, wherein the input phrase indicates a sentiment toward an aspect term. The network computes a gate vector based on the aspect term. The network identifies a dependency tree representing relations between words of the input phrase. The network generates a representation vector based on the dependency tree and the word embedding using a graph convolution network, wherein the gate vector is applied to a layer of the graph convolution network. The network generates a probability distribution over a plurality of sentiments based on the representation vector.

The sentiment analysis apparatus 110 may also include a processor unit, a memory unit, and a training component. The training component is used to train the sentiment analysis network. Additionally, the sentiment analysis apparatus 110 can communicate with the database 120 via the cloud 115. In some cases, the architecture of the sentiment analysis network is also referred to as a network model or a network. Further details regarding the architecture of the sentiment analysis apparatus 110 is provided with reference to FIGS. 3, 4 and 5. Further details regarding the operation of the sentiment analysis apparatus 110 is provided with reference to FIGS. 6 and 7.

In some cases, the sentiment analysis apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

A cloud 115 is a computer network configured to provide on-demand availability of computer system resources, such as data storage and computing power. In some examples, the cloud 115 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, a cloud is limited to a single organization. In other examples, the cloud is available to many organizations. In one example, a cloud includes a multi-layer communications network comprising multiple edge routers and core routers. In another example, a cloud is based on a local collection of switches in a single physical location.

A database 120 is an organized collection of data. For example, a database 120 stores data in a specified format known as a schema. A database 120 may be structured as a single database, a distributed database, multiple distributed databases, or an emergency backup database. In some cases, a database controller may manage data storage and processing in a database 120. In some cases, a user interacts with database controller. In other cases, database controller may operate automatically without user interaction.

Figure 2:
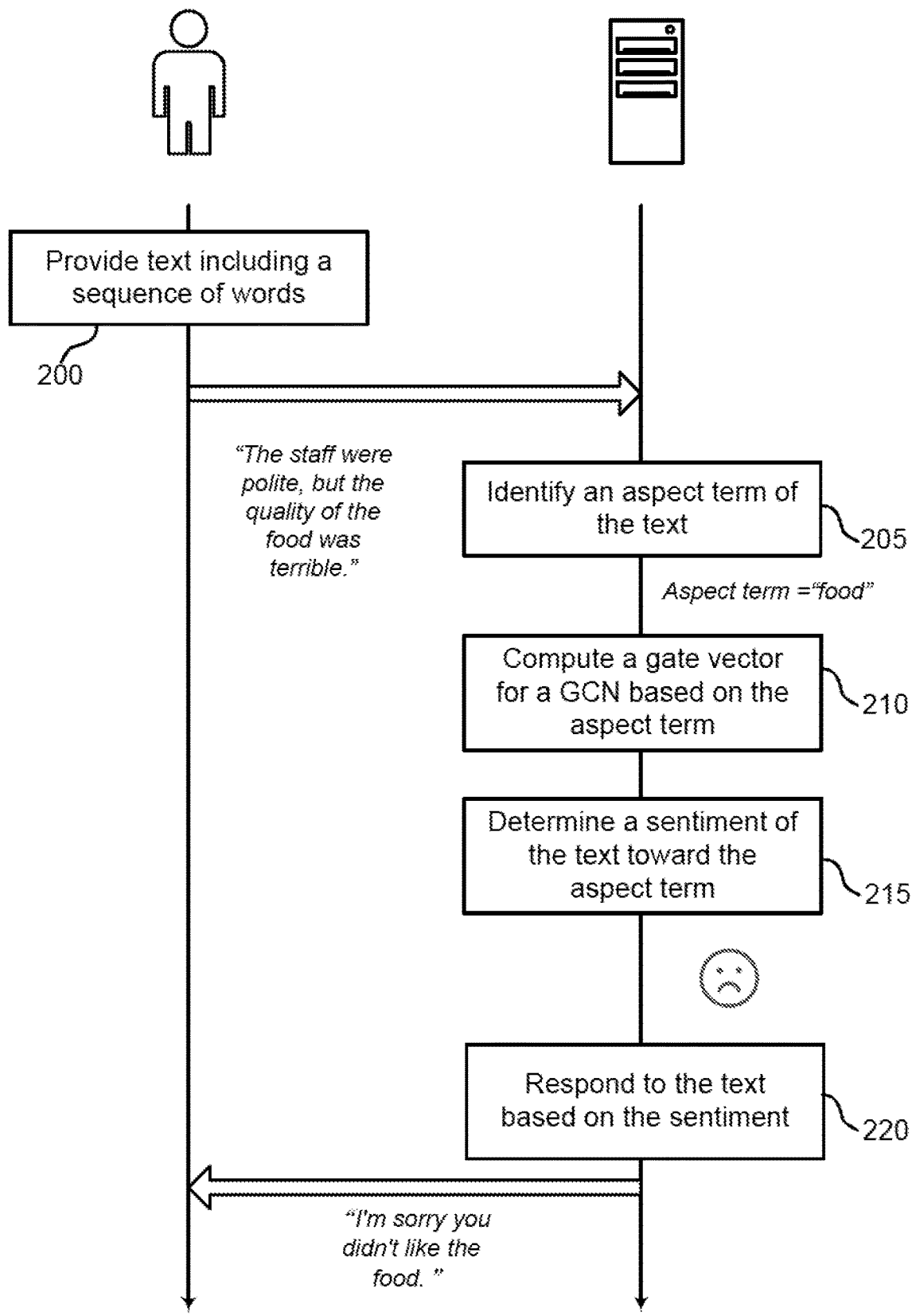
FIG. 2 shows an example of dialog processing using aspect-based sentiment analysis according to aspects of the present disclosure.

FIG. 2 shows an example of dialog processing using aspect-based sentiment analysis according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 200, the user provides text including a sequence of words. In some cases, the operations of this step refer to, or may be performed by, a user as described with reference to FIG. 1.

According to some embodiments, the system is configured to perform aspect-based sentiment analysis (ABSA), which is a fine-grained version of sentiment analysis that finds the sentiment polarity of input sentences towards a given aspect or an aspect term. Term-based aspects for ABSA relate to where the aspects correspond to one or more terms (i.e., a sequences of words) in an input sentence/phrase. According to an example, an input sentence to the system is "The staff were very polite, but the quality of the food was terrible".

At operation 205, the system identifies an aspect term of the text. In some cases, the operations of this step refer to, or may be performed by, a sentiment analysis network as described with reference to FIG. 3. In the above example, "food" is recognized as the aspect term.

At operation 210, the system computes a gate vector for a graph convolution network based on the aspect term. In some cases, the operations of this step refer to, or may be performed by, a graph convolution network as described with reference to FIGS. 3 and 4. A gate vector is computed by a graph convolution network of the system. In some cases, a gate vector may be computed by a separate component (i.e., external to a GCN model).

At operation 215, the system determines a sentiment of the text toward the aspect term. In some cases, the operations of this step refer to, or may be performed by, a sentiment analysis network as described with reference to FIG. 3. A set of sentiment may include positive sentiment, negative sentiment, and neutral sentiment. Based on the input phrase and the aspect term ("food"), in the example above, the system returns a negative sentiment for the input sentence.

At operation 220, the system responds to the text based on the determination and presents the response to the user. According to the example above, the system's response is "I'm sorry you didn't like the food." The user can view the response and provides another text including a different sequence of words. The aspect term may also change. In one example, assume the system receives the same input text, and the aspect term is instead "staff", then the system would determine a positive sentiment of the text toward the aspect term ("staff"). The system's response can also be the input to other downstream applications. For example, the response including results from the sentiment analysis process is used for subsequent recommendation (e.g., recommendation of restaurants). In some cases, the operations of this step refer to, or may be performed by, a user device (e.g., a user device having implemented a sentiment analysis application or dialog application) as described with reference to FIG. 1.

Network Architecture

Figure 3:
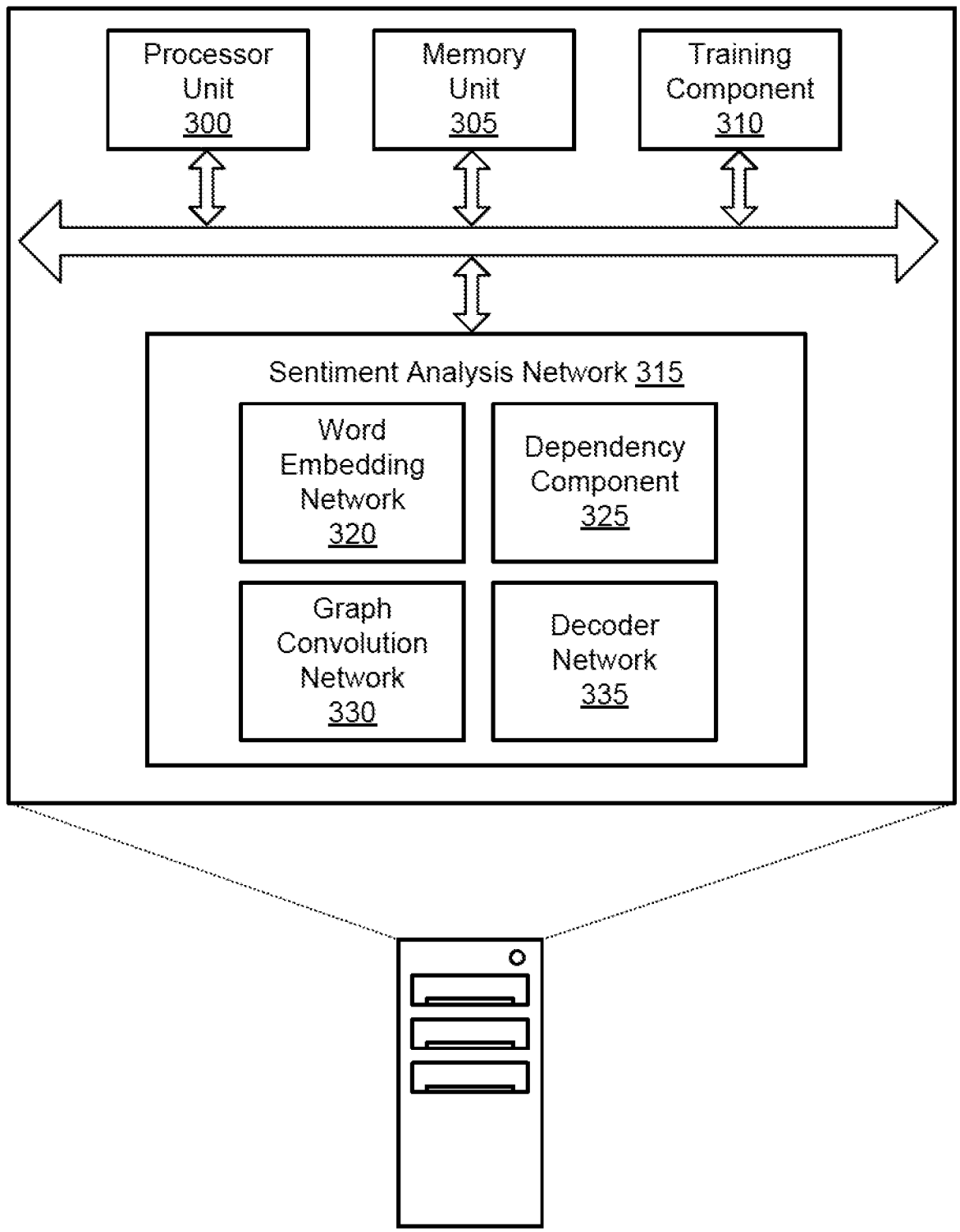
FIG. 3 shows an example of a sentiment analysis apparatus according to aspects of the present disclosure.
Figure 4:
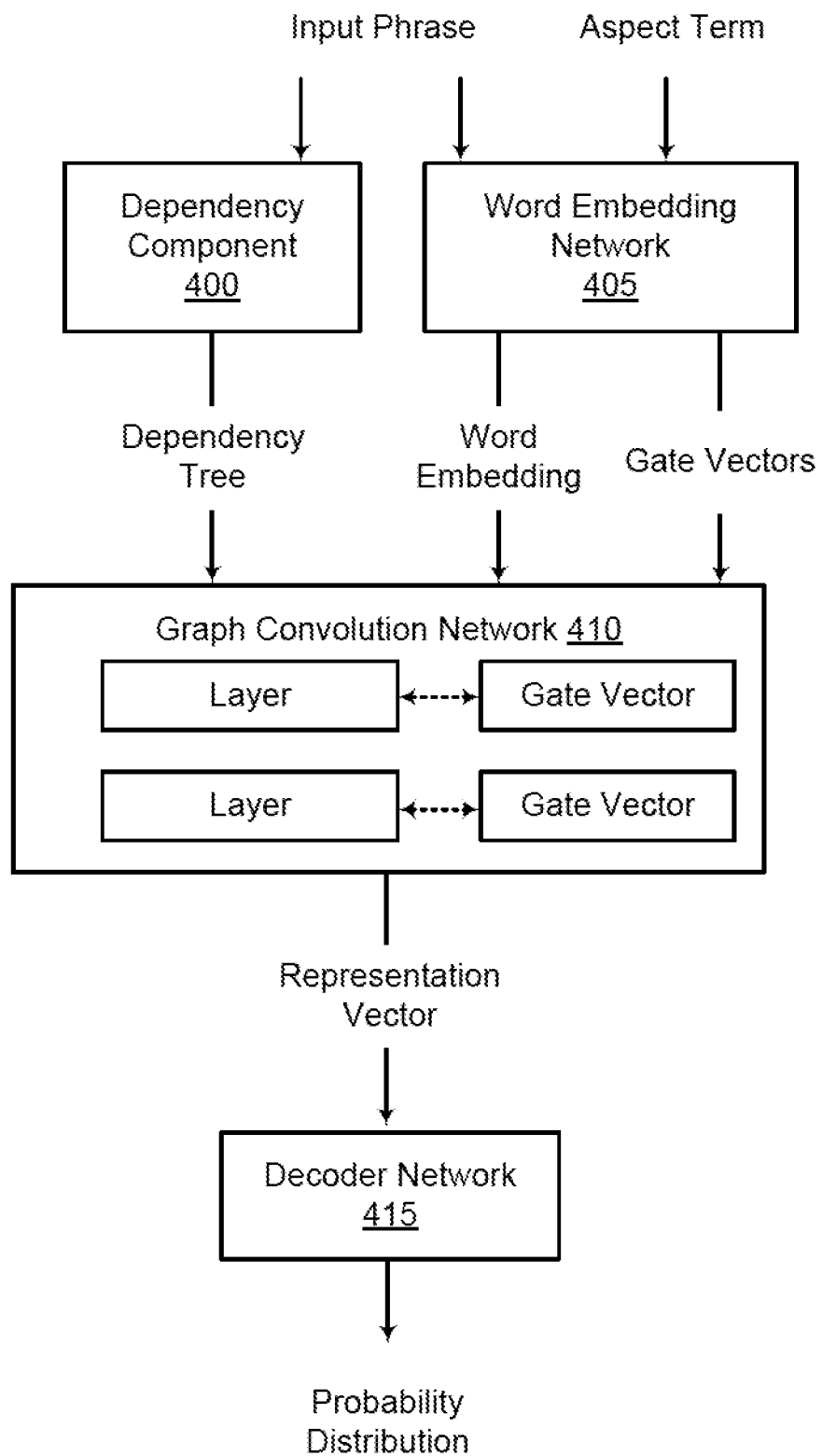
FIG. 4 shows an example of a sentiment analysis network according to aspects of the present disclosure.
Figure 5:
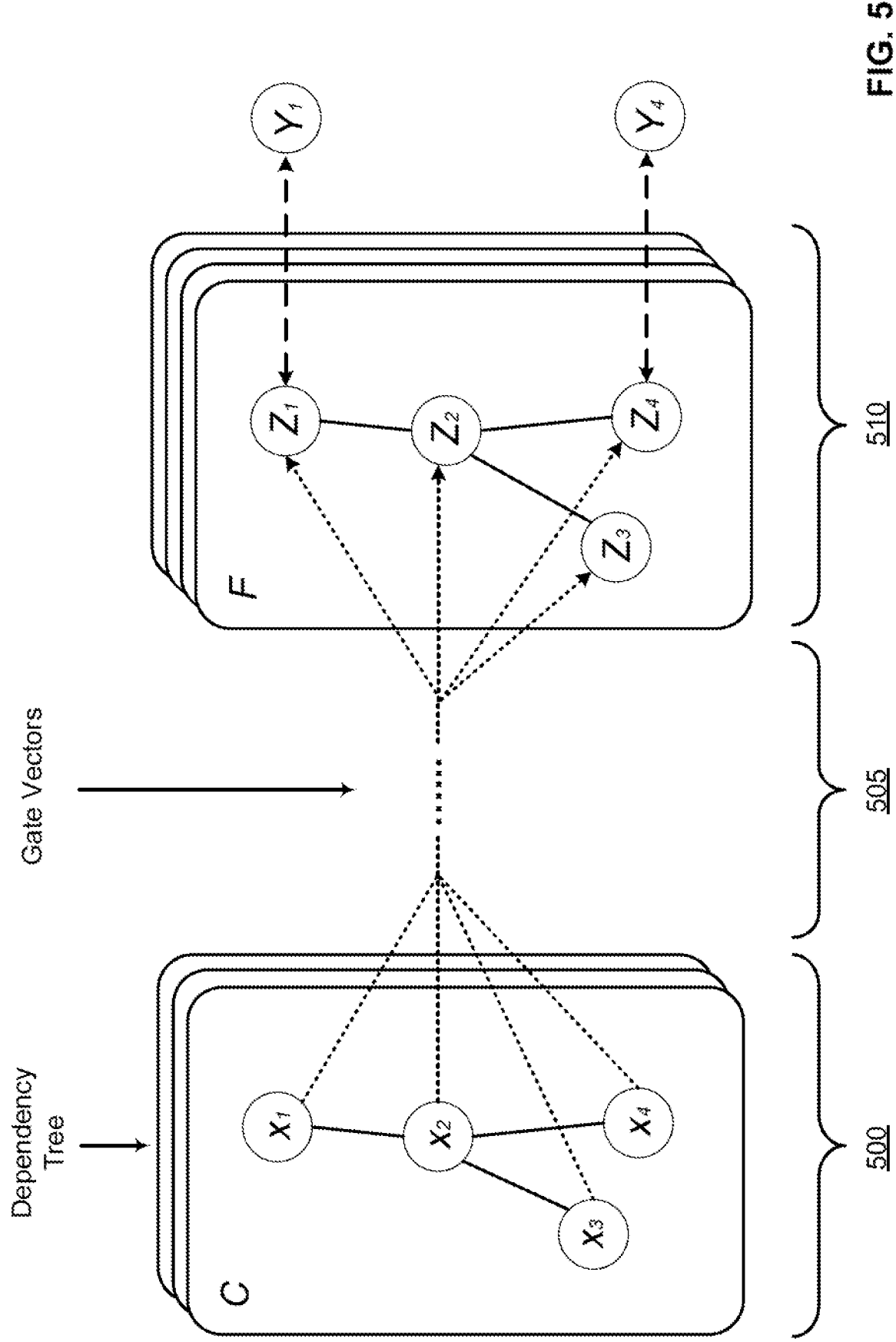
FIG. 5 shows an example of a gated graph convolutional network according to aspects of the present disclosure.

In FIGS. 3-5, an apparatus and method for natural language processing are described. One or more embodiments of the apparatus and method include a dependency component configured to generate a dependency tree for an input phrase, a graph convolution network configured to generate a representation vector for the input phrase based on the dependency tree, wherein the representation vector is generated by applying a gate vector representing an aspect term of the input phrase to a layer of the graph convolution network, and a decoder network configured to generate a probability distribution over a plurality of sentiments toward the aspect term based on the representation vector.

In some examples, the dependency component incorporates a natural language processing library. In some examples, the decoder network comprises a feed forward neural network with a softmax activation function. Some examples of the apparatus and method described above further include a word embedding network configured to generate a word embedding for each word of the input phrase, wherein the representation vector is generated based on the word embedding. In some examples, the word embedding network comprises a transformer network.

FIG. 3 shows an example of a sentiment analysis apparatus according to aspects of the present disclosure. The example shown includes processor unit 300, memory unit 305, training component 310, and sentiment analysis network 315. In one embodiment, sentiment analysis network 315 includes word embedding network 320, dependency component 325, graph convolution network 330, and decoder network 335.

A processor unit 300 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 300 is configured to operate a memory array using a memory controller. In other cases, a memory controller is integrated into the processor. In some cases, the processor unit 300 is configured to execute computer-readable instructions stored in a memory to perform various functions. In some embodiments, a processor unit 300 includes special purpose components for modem processing, baseband processing, digital signal processing, or transmission processing.

Examples of a memory unit 305 include random access memory (RAM), read-only memory (ROM), or a hard disk.

Examples of memory unit 305 include solid state memory and a hard disk drive. In some examples, a memory unit 305 is used to store computer-readable, computer-executable software including instructions that, when executed, cause a processor to perform various functions described herein. In some cases, the memory unit 305 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory unit 305 store information in the form of a logical state.

According to some embodiments of the present disclosure, the sentiment analysis apparatus includes a computer implemented artificial neural network (ANN) that predicts the sentiment of an input phrase toward an aspect term based on a probability distribution over a set of sentiments. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

According to some embodiments, the sentiment analysis network 315 includes a graph convolutional network (GCN). A GCN is a type of neural network that defines convolutional operation on graphs and uses their structural information. For example, a GCN may be used for node classification (e.g., documents) in a graph (e.g., a citation network), where labels are available for a subset of nodes using a semi-supervised learning approach. A feature description for every node is summarized in a matrix and uses a form of pooling operation to produce a node level output. In some cases, GCNs use dependency trees which enrich representation vectors for aspect terms and search for sentiment polarity of an input phrase/sentence. The sentiment analysis network 315 predicts the sentiment of an input phrase toward an aspect term based on a probability distribution over a set of sentiments.

According to some embodiments, training component 310 identifies a training set including an input phrase, an aspect term, a dependency tree, and a ground truth sentiment of the input phrase toward the aspect term. In some examples, training component 310 computes a multi-task loss function including a prediction loss based on comparing the ground truth sentiment with the probability distribution over the set of sentiments. The training component 310 then trains the graph convolution network 330 based on the multi-task loss function. In some examples, the prediction loss includes a negative log likelihood of the ground truth sentiment. In some examples, training component 310 computes a divergence loss based on a diversity of a set of gate vectors corresponding to different layers of the graph convolution network 330, where the multi-task loss function includes the divergence loss. In some examples, training component 310 computes a similarity score between a hidden representation vector corresponding to the gate vector and a hidden representation vector corresponding to each of the set of gate vectors, where the divergence loss is based on the similarity score. In some examples, training component 310 computes a consistency loss based on a syntax-based importance score and a model-based importance score for each word of the input phrase, where the multi-task loss function includes the consistency loss.

In some examples, training component 310 computes a path length between each word in the input phrase and the aspect term, where the syntax-based importance score is based on the path length. In some examples, training component 310 computes a ratio between the syntax-based importance score and the model-based importance score, where the consistency loss is based on the ratio.

According to some embodiments, word embedding network 320 generates a word embedding for each word of an input phrase, where the input phrase indicates a sentiment toward an aspect term. In some examples, word embedding network 320 generates an aspect term embedding for the aspect term. In some examples, word embedding network 320 combines words of the input phrase with a special token to produce an input sequence, where the word embedding is generated based on the input sequence. In some examples, word embedding network 320 generates a sentence embedding corresponding to the special token, where the representation vector is generated by combining the sentence embedding and an output of the graph convolution network 330.

According to some embodiments, word embedding network 320 is configured to generate a word embedding for each word of the input phrase, wherein the representation vector is generated based on the word embedding. In some examples, the word embedding network 320 includes a transformer network. Word embedding network 320 is an example of, or includes aspects of, the corresponding element described with reference to FIG. 4.

According to some embodiments, dependency component 325 identifies a dependency tree representing relations between words of the input phrase. The dependency component 325 is configured to generate a dependency tree for an input phrase. In some examples, the dependency component 325 incorporates a natural language processing library. Dependency component 325 is an example of, or includes aspects of, the corresponding element described with reference to FIG. 4.

According to some embodiments, graph convolution network 330 computes a gate vector based on the aspect term. In some examples, graph convolution network 330 generates a representation vector based on the dependency tree and the word embedding, where the gate vector is applied to a layer of the graph convolution network 330. In some examples, graph convolution network 330 weights the aspect term embedding by a weighting parameter corresponding to the layer of the graph convolution network 330, where the gate vector is based on the weighted aspect term embedding. In some examples, values of a first layer of the graph convolution network 330 are set based on the word embedding. In some examples, graph convolution network 330 aggregates hidden vectors corresponding to words of the input phrase at the layer of the graph convolution network 330 to produce a subsequent hidden vector at a subsequent layer of the graph convolution network 330. In some examples, graph convolution network 330 combines each of the hidden vectors with the gate vector to produce a regulated hidden vector, where the subsequent hidden vector is based on the regulated hidden vector. In some examples, graph convolution network 330 generates a set of gate vectors based on the aspect term, where each of the set of gate vectors corresponds to a different layer of the graph convolution network 330.

According to some embodiments, graph convolution network 330 is configured to generate a representation vector for the input phrase based on the dependency tree, wherein the representation vector is generated by applying a gate vector representing an aspect term of the input phrase to a layer of the graph convolution network 330.

According to some embodiments, graph convolution network 330 generates a representation vector for the input phrase based on the dependency tree by applying the gate vector to a layer of a graph convolution network 330. In some examples, graph convolution network 330 multiplies a hidden vector corresponding to each word of the input phrase by each of the set of gate vectors to produce a set of regulated hidden vectors. The graph convolution network 330 combines regulated hidden vectors corresponding to each word of the input phrase to produce a hidden representation vector corresponding to each of the set of gate vectors. In some examples, graph convolution network 330 computes hidden vectors for each word of the input phrase at each layer of the graph convolution network 330 based on the dependency tree, where the model-based importance score is based on the hidden vectors. Graph convolution network 330 is an example of, or includes aspects of, the corresponding element described with reference to FIG. 4.

According to some embodiments, decoder network 335 is configured to generate a probability distribution over a set of sentiments toward the aspect term based on the representation vector. In some examples, the decoder network 335 includes a feed forward neural network with a softmax activation function. Decoder network 335 is an example of, or includes aspects of, the corresponding element described with reference to FIG. 4.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

FIG. 4 shows an example of a sentiment analysis network according to aspects of the present disclosure. The example shown includes dependency component 400, word embedding network 405, graph convolution network 410, and decoder network 415.

In some embodiments, sentiment analysis is formalized using a sentence of n words or tokens and the index for an aspect term. The sentiment analysis network is configured to predict the sentiment polarity toward the aspect term for the sentence. In an embodiment, the sentiment analysis network includes multiple components (i.e., representation learning component, graph convolution and regulation component, and syntax and model consistency component).

As illustrated in FIG. 4, an input phrase is input to dependency component 400 to produce a dependency tree. The same input phrase is also input to word embedding network 405 to produce word embedding. Additionally, an aspect term is input to word embedding network 405 to produce one or more gate vectors.

As for representation learning, the network model includes contextualized word embeddings encoder representations. In some examples, bidirectional encoder representations from transformers (BERT) are used to obtain the representation vectors for the words in the sentence. The network model generates a sequence of words including special tokens (e.g., [CLS], [SEP]) in a BERT model. The word sequence is fed into a pre-trained BERT model to obtain the hidden vectors in the last layer of the BERT model. As a result, in an embodiment, the input phrase is represented by a vector sequence. In some cases, this embedding process is also referred to as representation learning. Word embedding network 405 is an example of, or includes aspects of, the corresponding element described with reference to FIG. 3.

In an embodiment, the input sequence is a version of the input phrase that is prepared for use with a word embedding network (e.g., BERT model) by including one or more special tokens. The sentence embedding is another output of the word embedding network (e.g., corresponding to a special token), and the sentence embedding is combined with the output of the GCN to produce the representation vector.

In some embodiments, dependency trees are used in a graph convolution and regulation component of the network model by applying a GCN model to perform a number of abstraction layers (e.g., L layers) over the word representation vector sequence (i.e., the vector sequence obtained above). A hidden vector of a word with index i in the current layer of GCN model is obtained by aggregating the hidden vectors of the dependency-based neighbor words of the word with index i in the previous layer of the GCN model. For example, hidden vectors at a layer (as long as the layer is not an initial layer of the GCN model) are computed based on a set of the neighbor words of the word with index i in the dependency tree. Dependency component 400 is an example of, or includes aspects of, the corresponding element described with reference to FIG. 3.

Dependency tree, word embedding, and gate vectors are input to graph convolution network 410. The graph convolution network 410 generates a representation vector as output. Graph convolution network 410 is an example of, or includes aspects of, the corresponding element described with reference to FIG. 3.

In some cases, GCN hidden vectors are computed without knowing or incorporating the aspect term which may retain irrelevant or confusing information in the representation vectors (e.g., a sentence or an input phrase includes two aspect terms having different sentiment polarity). In some embodiments, the hidden vectors in GCN are regulated to focus on the provided aspect term, the network model computes a gate vector $g_l$ for each layer l of the GCN using a representation vector of the aspect term. The gate or gate vector is applied over the hidden vectors of the l-th layer using element-wise multiplication, generating the regulated hidden vector for a corresponding hidden vector for the l-th layer.

The hidden vectors of the GCN model at different layers can capture different levels of contextual information in the sentence or the input phrase. The gate vectors for these layers exhibit a difference level for contextual information to match those in the GCN hidden vectors. The gate diversity in the network model is enforced by ensuring that the regulated GCN hidden vectors are distinctive, where these regulated GCN hidden vectors are obtained by applying different gates to the same GCN hidden vectors. The contextual information is exploited in the hidden vectors of the GCN model to ground the information in gate vectors for explicit gate diversity promotion (i.e., increase in gate diversity of the GCN).

The representation vector is input to decoder network 415 to produce probability distribution. In some embodiments, an overall representation vector V for the input sentence/phrase is obtained for the input phrase or the sentence to predict the sentiment for the aspect term (e.g., the sentiment prediction is generated based on calculating model-based importance scores). The overall representation vector V is computed using the sentence representation vector from BERT and the regulated hidden vectors in the last layer of the GCN model. The overall representation vector is input to the decoder network 415 to produce a probability distribution over a set of sentiments (e.g., positive, negative, and neural sentiment). A word in the input sentence is considered more contextually important than the other words if its regulated GCN hidden vector in the last GCN layer (e.g., a last layer is the L-th layer) is more similar to V than those for the other words.

In an embodiment, the overall representation vector V is fed into a feed-forward neural network with a normalized exponential function (e.g., softmax) to estimate probability distribution $P(\cdot|X, x_t)$ over the sentiments for the sentence and the aspect term. Decoder network 415 is an example of, or includes aspects of, the corresponding element described with reference to FIG. 3.

FIG. 5 shows an example of a gated graph convolutional network according to aspects of the present disclosure. The example shown includes input layer 500, hidden layers 505, and output layer 510. In some cases, hidden layers 505 correspond to a total number of L layers in a graph convolution network. GCN hidden vector for i-th word of an input sentence at a first layer of the GCN (i.e., an initial layer) is set to the word representation vector corresponding to the i-th word. Afterwards, a hidden vector for i-th word at an l-th layer (as long as l-th layer is not the initial layer of the GCN) is computed based on ReLU function and information related to a set of neighbor words of an i-th word in a dependency tree. At a final step, an overall representation vector for an input sentence is generated to predict the sentiment for an aspect term. The overall representation vector is computed using sentence representation vector from BERT model and regulated hidden vectors in the last layer of the GCN.

In an embodiment, dependency tree is input to the input layer 500. A dependency component of the sentiment analysis apparatus is configured to generate a dependency tree for an input phrase. In some embodiments, the dependency component incorporates or is configured to operate based on a natural language processing (NLP) library. In some examples, the NLP library may include Stanford NLP library, SpaCy, etc.

In some embodiments, dependency trees are integrated into deep learning models to produce a network model for aspect-based sentiment analysis (ABSA). The sentiment analysis network uses the overall contextual importance scores of words, which are obtained from a dependency tree for ABSA. One or more embodiments of the present disclosure include a graph-based deep learning model (e.g., GCN) that considers aspect terms and an overall contextual importance scores of words. The sentiment analysis network generates gate vectors from representation vectors of aspect terms to customize hidden vectors of graph-based models towards the aspect terms. Additionally, the sentiment analysis network obtains importance scores for each word in the sentences based on the dependency trees on which the network model depends to enhance representation vectors for aspect-based sentiment analysis.

One or more embodiments of the present disclosure use representation vectors for words from an input phrase/sentence in different layers of a graph convolution network. The GCN model is customized for the aspect terms to produce representation vectors. Representation vectors in the sentiment analysis network include related information for the aspect terms which are the key words in the sentences. In some cases, the sentiment analysis network can regulate hidden vectors of the GCN model using information from the aspect terms, thus filtering irrelevant information for the terms and customizing representation vectors for aspect-based sentiment analysis. The sentiment analysis network computes a gate vector for each layer of the GCN model based on the representation vectors of the aspect terms. The layer-wise gate vector is then applied over the hidden vectors of a current layer of the GCN to produce customized hidden vectors for the current layer. In some cases, the customized hidden vectors may also be referred to as regulated hidden vectors. Additionally, one or more embodiments of the present disclosure explicitly increase contextual distinction among the gates or gate vectors (i.e., increase in gate diversity) to enhance the representation vectors.

As illustrated in FIG. 5, dependency tree is input to the input layers 500. The dependency tree may contain information that is not present in data X, such as citation links between documents in a citation network or relations in a knowledge graph. In an example, a multi-layer graph convolutional network for semi-supervised learning includes C input channels (input layer 500) and F feature maps in the output layer 510. The graph structure (edges shown as solid lines) is shared over layers, labels are denoted by $Y_i$. In some embodiments, the sentiment analysis network includes a GCN, where the GCN generates a set of gate vectors based on an aspect term (e.g., aspect term is "food" in the example provided in FIGS. 1 and 2), wherein each of the set of gate vectors corresponds to a different layer of the GCN. For example, the GCN combines each of the hidden vectors with a gate vector (the gate vector is computed based on the aspect term) to produce a regulated hidden vector, where the subsequent hidden vector is based on the regulated hidden vector.

Sentiment Analysis

Figure 6:
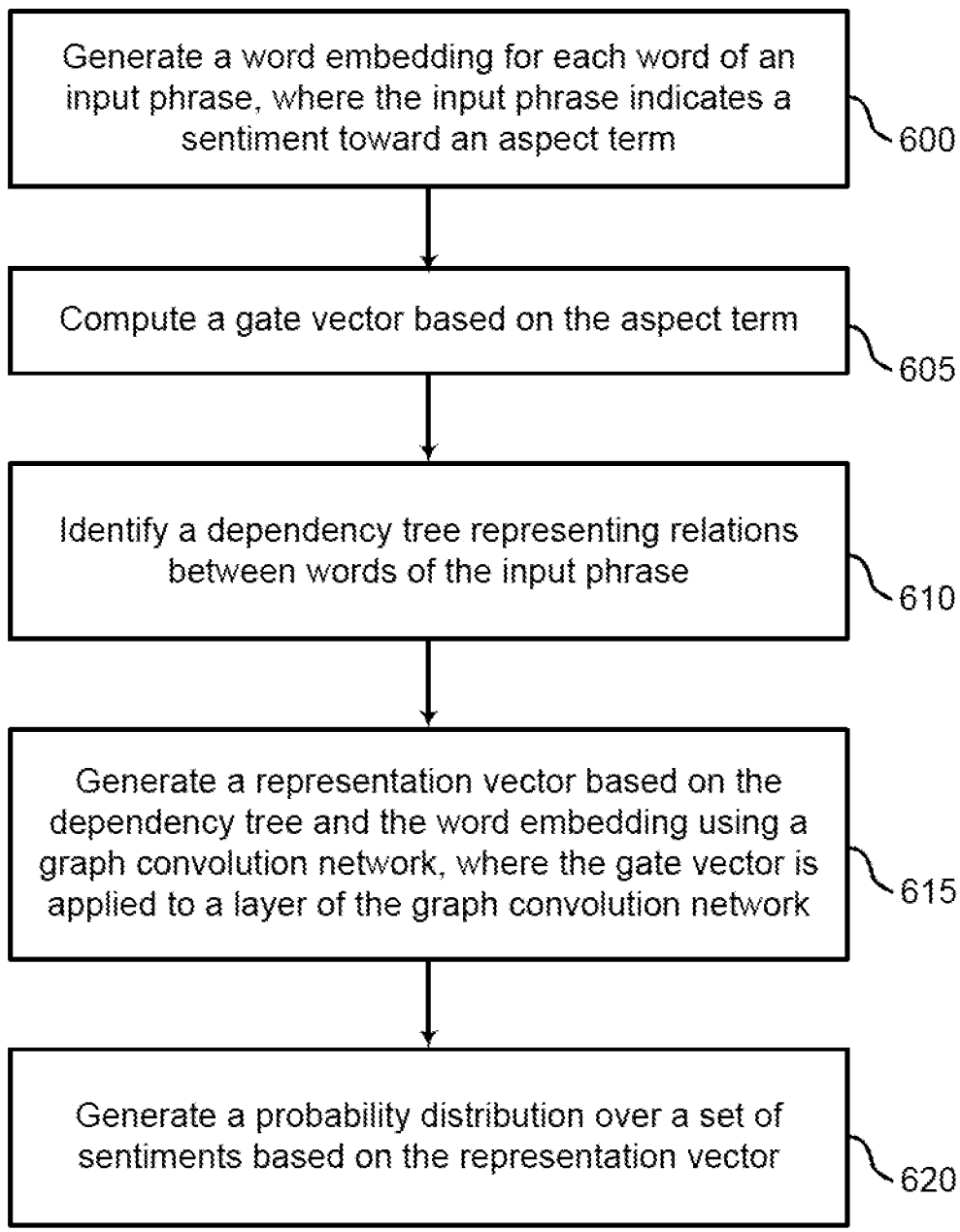
FIG. 6 shows an example of a process for sentiment analysis according to aspects of the present disclosure.
Figure 7:
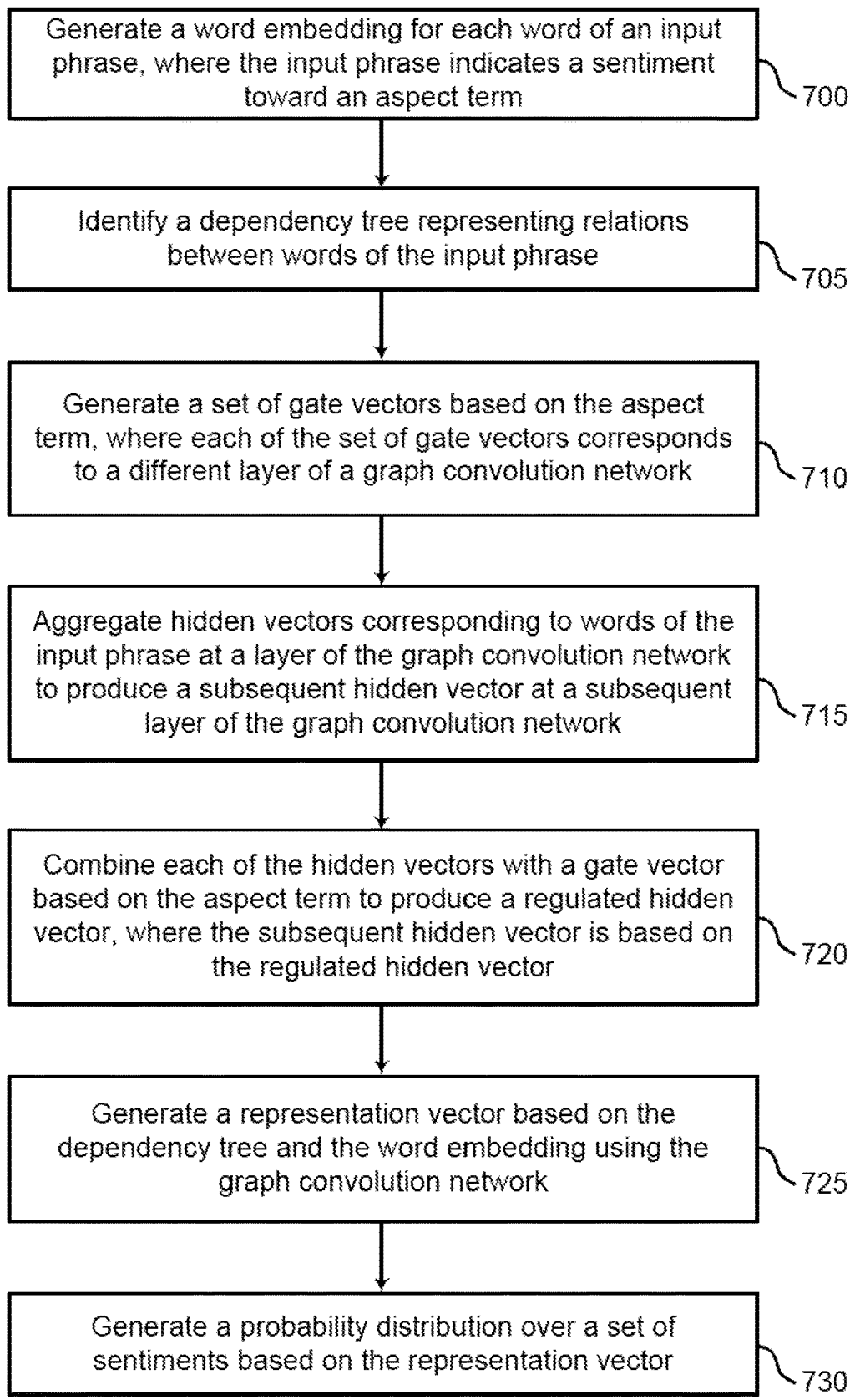
FIG. 7 shows an example of a process for sentiment analysis using gate vectors on a graph convolution network according to aspects of the present disclosure.

In accordance with FIG. 6-7, a method, apparatus, and non-transitory computer readable medium for natural language processing are described. One or more embodiments of the method, apparatus, and non-transitory computer readable medium include generating a word embedding for each word of an input phrase, wherein the input phrase indicates a sentiment toward an aspect term, computing a gate vector based on the aspect term, identifying a dependency tree representing relations between words of the input phrase, generating a representation vector based on the dependency tree and the word embedding using a graph convolution network, wherein the gate vector is applied to a layer of the graph convolution network, and generating a probability distribution over a plurality of sentiments based on the representation vector.

Some examples of the method, apparatus, and non-transitory computer readable medium described above further include generating an aspect term embedding for the aspect term. Some examples further include weighting the aspect term embedding by a weighting parameter corresponding to the layer of the graph convolution network, wherein the gate vector is based on the weighted aspect term embedding.

Some examples of the method, apparatus, and non-transitory computer readable medium described above further include setting values of a first layer of the graph convolution network based on the word embedding.

Some examples of the method, apparatus, and non-transitory computer readable medium described above further include combining words of the input phrase with a special token to produce an input sequence, wherein the word embedding is generated based on the input sequence.

Some examples of the method, apparatus, and non-transitory computer readable medium described above further include generating a sentence embedding corresponding to the special token, wherein the representation vector is generated by combining the sentence embedding and an output of the graph convolution network.

Some examples of the method, apparatus, and non-transitory computer readable medium described above further include aggregating hidden vectors corresponding to words of the input phrase at the layer of the graph convolution network to produce a subsequent hidden vector at a subsequent layer of the graph convolution network.

Some examples of the method, apparatus, and non-transitory computer readable medium described above further include combining each of the hidden vectors with the gate vector to produce a regulated hidden vector, wherein the subsequent hidden vector is based on the regulated hidden vector.

Some examples of the method, apparatus, and non-transitory computer readable medium described above further include generating a plurality of gate vectors based on the aspect term, wherein each of the plurality of gate vectors corresponds to a different layer of the graph convolution network.

Some examples of the method, apparatus, and non-transitory computer readable medium described above further include predicting the sentiment of the input phrase toward the aspect term based on the probability distribution.

FIG. 6 shows an example of a process for sentiment analysis according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 600, the system generates a word embedding for each word of an input phrase, where the input phrase indicates a sentiment toward an aspect term. In some cases, the operations of this step refer to, or may be performed by, a word embedding network as described with reference to FIGS. 3 and 4.

In some embodiments, aspect-based sentiment analysis can be formalized using a sentence $X=[x_1, x_2, \ldots, x_n]$ of n words or tokens and the index $t(1 \le t \le n)$ for an aspect term $x_t$. The sentiment analysis network is configured to predict the sentiment polarity $y^*$ toward the aspect term $x_t$ for X. The system includes a network model (i.e., the sentiment analysis network) for sentiment analysis. In some examples, the sentiment analysis network includes a representation learning component, a graph convolution and regulation component, and syntax and model consistency component.

For representation learning, the network model includes contextualized word embeddings encoder representations (e.g., a BERT model) are used to obtain the representation vectors for the words in X. The sentiment analysis network generates a sequence of words of the form $\hat{X}=[CLS]+X+[SEP]+x_t+[SEP]$ where [CLS] and [SEP] are the special tokens in a BERT model. The word sequence is fed into a pre-trained BERT model to obtain the hidden vectors in the last layer. An embedding vector $e_i$ is obtained for each word $x_i \in X$ by averaging the hidden vectors of $x_i$'s sub-word units (i.e., wordpiece). As a result, in an embodiment, the input sentence X is represented by a vector sequence $E=e_1, e_2, \ldots, e_n$. A hidden vector s is employed for the special token [CLS] in $\hat{X}$ from BERT to encode an overall input sentence X and the aspect term $x_t$.

At operation 605, the system computes a gate vector based on the aspect term. In some cases, the operations of this step refer to, or may be performed by, a graph convolution network as described with reference to FIGS. 3 and 4. In some examples, a gate vector is computed by a graph convolution network of the system. In some other examples, a gate vector is computed or generated by a separate component (i.e., external to the GCN).

GCN hidden vectors $h_i^l$ (i.e., hidden vector at l-th layer of the GCN corresponding to the i-th word of the input phrase) are computed without being aware of the aspect term $x_t$. As a result, existing technology may retain irrelevant or confusing information in the representation vectors (e.g., a sentence includes two aspect terms having different sentiment polarity). In an embodiment, the hidden vectors in the GCN may be regulated to focus on the provided aspect term $x_t$, the network model computes a gate vector $g_l$ for each layer l of GCN using a representation vector $e_t$ of the aspect term:

$$g_l = (\sigma W_l^g e_t) \tag{1}$$

The gate or gate vector is applied over the hidden vectors $h_i^l$ of the l-th layer using element-wise multiplication $\circ$, generating the regulated hidden vector $\bar{h}_i^l$ for $h_i^l$ formulated as follows:

$$\bar{h}_i^l = g_l \circ h_i^l \tag{2}$$

At operation 610, the system identifies a dependency tree representing relations between words of the input phrase. In some cases, the operations of this step refer to, or may be performed by, a dependency component as described with reference to FIGS. 3 and 4. In some examples, the system identifies a dependency tree before computing the gate vector based on the aspect term.

Dependency trees for ABSA are used in a graph convolution and regulation component of the network model by applying a GCN model to perform L abstraction layers over the word representation vector sequence E. A hidden vector for a word $x_i$ in a current layer of GCN is obtained by aggregating the hidden vectors of dependency-based neighbor words of $x_i$ in the previous layer. Let $h_i^l$ ($0 \leq l \leq L$, $1 \leq i \leq n$) be the hidden vector of the word $x_i$ at the l-th layer of GCN. Initially, the GCN hidden vector $h_i^0$ at the zero layer is set to the word representation vector $e_i$. Computation of $h_i^l$ ($l>0$) is formulated as:

$$h_i^l = ReLU(W_l \hat{h}_i^l), \hat{h}_i^l = \sum_{j \in N(i)} h_j^{l-1} / |N(i)| \qquad (3)$$

where N(i) is the set of neighbor words of $x_i$ in the dependency tree. Biases in the equations are omitted for simplicity herein in this specification. In a neural network, an activation function may be used to transforming summed weighted inputs from a node into the activation of the node or an output. A ReLU layer may implement a rectified linear activation function, which comprises a piecewise linear function that outputs the input directly if is positive, otherwise, it outputs zero. A rectified linear activation function may be used as a default activation function for many types of neural networks. Using a rectified linear activation function may enable the use of stochastic gradient descent with backpropagation of errors to train deep neural networks. The rectified linear activation function may operate similar to a linear function, but it may enable complex relationships in the data to be learned. The rectified linear activation function may also provide more sensitivity to the activation sum input to avoid saturation. A node or unit that implements a rectified linear activation function may be referred to as a rectified linear activation unit, or ReLU for short. Networks that use a rectifier function for hidden layers may be referred to as rectified networks.

At operation 615, the system generates a representation vector based on the dependency tree and the word embedding using a graph convolution network, where the gate vector is applied to a layer of the graph convolution network. In some cases, the operations of this step refer to, or may be performed by, a graph convolution network as described with reference to FIGS. 3 and 4.

The hidden vectors of the GCN at different layers can capture different levels of contextual information in the input sentence. The gate vectors $g_t$ for these layers exhibit a difference level for contextual information to match those in the GCN hidden vectors. The gate diversity in the GCN model is enforced by ensuring that the regulated GCN hidden vectors are distinctive. These regulated GCN hidden vectors are obtained by applying different gates to the same GCN hidden vectors. The contextual information is exploited in the hidden vectors of GCN to ground the information in gate vectors for explicit gate diversity promotion.

In some embodiments, an overall representation vector V is obtained for the input sentence X to predict the sentiment for $x_t$ in model-based importance scores. The overall representation vector V is computed using the sentence representation vector s from BERT and the regulated hidden vectors in the last layer of GCN:

$$V = [s, \max\_pool(\hat{h}_1^L, \ldots, \hat{h}_n^L)] \qquad (4)$$

Based on this overall representation vector V, a word $x_i$ is more contextually useful for aspect-based sentiment analysis if the regulated GCN hidden vector $\hat{h}_i^l$ for $x_i$ in the last GCN layer is more similar to V than those for the other words of the input phrase/sentence. The GCN hidden vector of a contextually useful word captures useful information to predict the sentiment for $x_t$, thus sentiment classification is performed by encoding overall relevant context information of X similar to V. The approach is implemented by using dot product of transformed vectors for V and $\hat{h}_i^L$ to determine the model-based importance score for $x_i$ as follows:

$$mod_i = \sigma(W_V V) \cdot \sigma(W_H \hat{h}_i^l) \qquad (5)$$

At operation 620, the system generates a probability distribution over a set of sentiments based on the representation vector. In some cases, the operations of this step refer to, or may be performed by, a decoder network as described with reference to FIGS. 3 and 4.

In an embodiment, the overall representation vector V is input to a feed-forward neural network with softmax to estimate the probability distribution $P(\cdot|X, x_t)$ over the sentiments for X and $x_t$. The softmax function is used as the activation function of the neural network to normalize the output of the network to a probability distribution over predicted output classes. After applying the softmax function, each component of the feature map is in the interval (0, 1) and the components add up to one. These values are interpreted as probabilities.

FIG. 7 shows an example of a process for sentiment analysis using gate vectors on a graph convolution network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 700, the system generates a word embedding for each word of an input phrase, where the input phrase indicates a sentiment toward an aspect term. In some cases, the operations of this step refer to, or may be performed by, a word embedding network as described with reference to FIGS. 3 and 4.

At operation 705, the system identifies a dependency tree representing relations between words of the input phrase. In some cases, the operations of this step refer to, or may be performed by, a dependency component as described with reference to FIGS. 3 and 4.

At operation 710, the system generates a set of gate vectors based on the aspect term, where each of the set of gate vectors corresponds to a different layer of a graph convolution network.

At operation 715, the system aggregates hidden vectors corresponding to words of the input phrase at a layer of the graph convolution network to produce a subsequent hidden vector at a subsequent layer of the graph convolution network. In some cases, the operations of this step refer to, or may be performed by, a graph convolution network as described with reference to FIGS. 3 and 4.

At operation 720, the system combines each of the hidden vectors with a gate vector based on the aspect term to produce a regulated hidden vector, where the subsequent hidden vector is based on the regulated hidden vector. In some cases, the operations of this step refer to, or may be performed by, a graph convolution network as described with reference to FIGS. 3 and 4.

In an embodiment, given the l-th layer of the GCN, an overall representation vector $\overline{h}_l$ for the regulated hidden vectors is obtained at the l-th layer using a max-pooled vector: $\overline{h}^l = \max\_pool(\overline{h}_1^l, \ldots, \overline{h}_n^l)$. Then, the network model applies the gate vectors $g^{l'}$ from other layers ($l' \neq l$) to the GCN hidden vectors $h_i^l$ at the l-th layer, resulting in regulated hidden vectors $\overline{h}_i^{l,l'} = g^{l'} \circ h_i^l$. An overall representation vector $\overline{h}^{l,l'}$ is computed with max-pooling: $\overline{h}^{l,l'} = \max\_pool(\overline{h}_1^{l,l'}, \ldots, \overline{h}_n^{l,l'})$ for each of the other layers $l'$.

A pooling layer is a new layer added after the convolutional layer. The pooling layer is used for ordering layers within a convolutional neural network that may be repeated one or more times within a neural network model. The pooling layer operates upon each feature map separately to create a new set of the same number of pooled feature maps. Pooling includes selecting a pooling operation. In some cases, the size of the pooling operation is smaller than the size of the feature map. For example, the size of the pooling operation is 2×2 pixels with a stride of two pixels. Average pooling or maximum pooling operation may be used.

At operation 725, the system generates a representation vector based on the dependency tree and the word embedding using the graph convolution network. In some cases, the operations of this step refer to, or may be performed by, a graph convolution network as described with reference to FIGS. 3 and 4.

At operation 730, the system generates a probability distribution over a set of sentiments based on the representation vector. The system then predicts the sentiment of the input phrase toward the aspect term based on the probability distribution. In some cases, the operations of this step refer to, or may be performed by, a decoder network as described with reference to FIGS. 3 and 4.

Training and Evaluation

Figure 8:
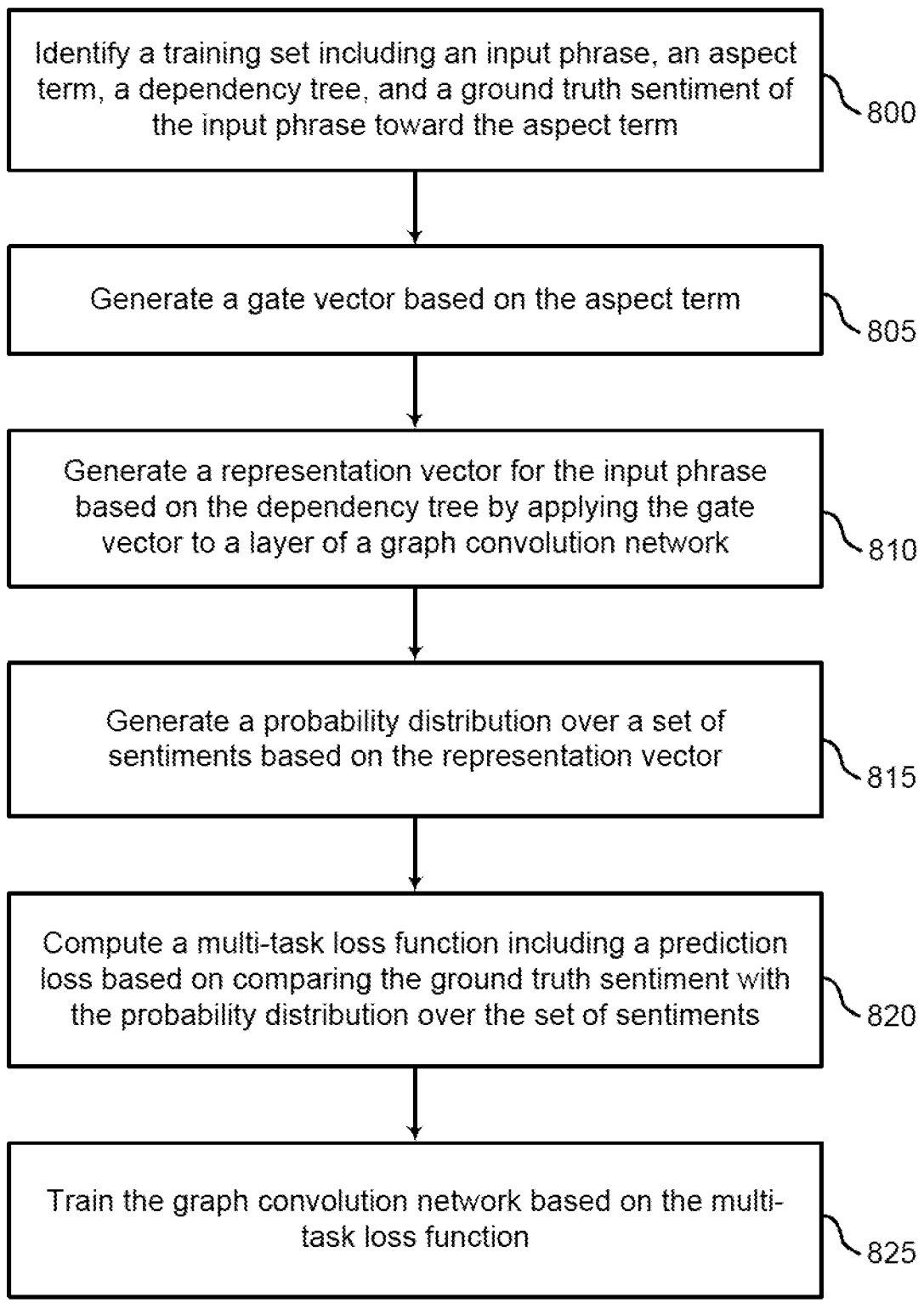
FIG. 8 shows an example of a process for training a sentiment analysis network according to aspects of the present disclosure.
Figure 9:
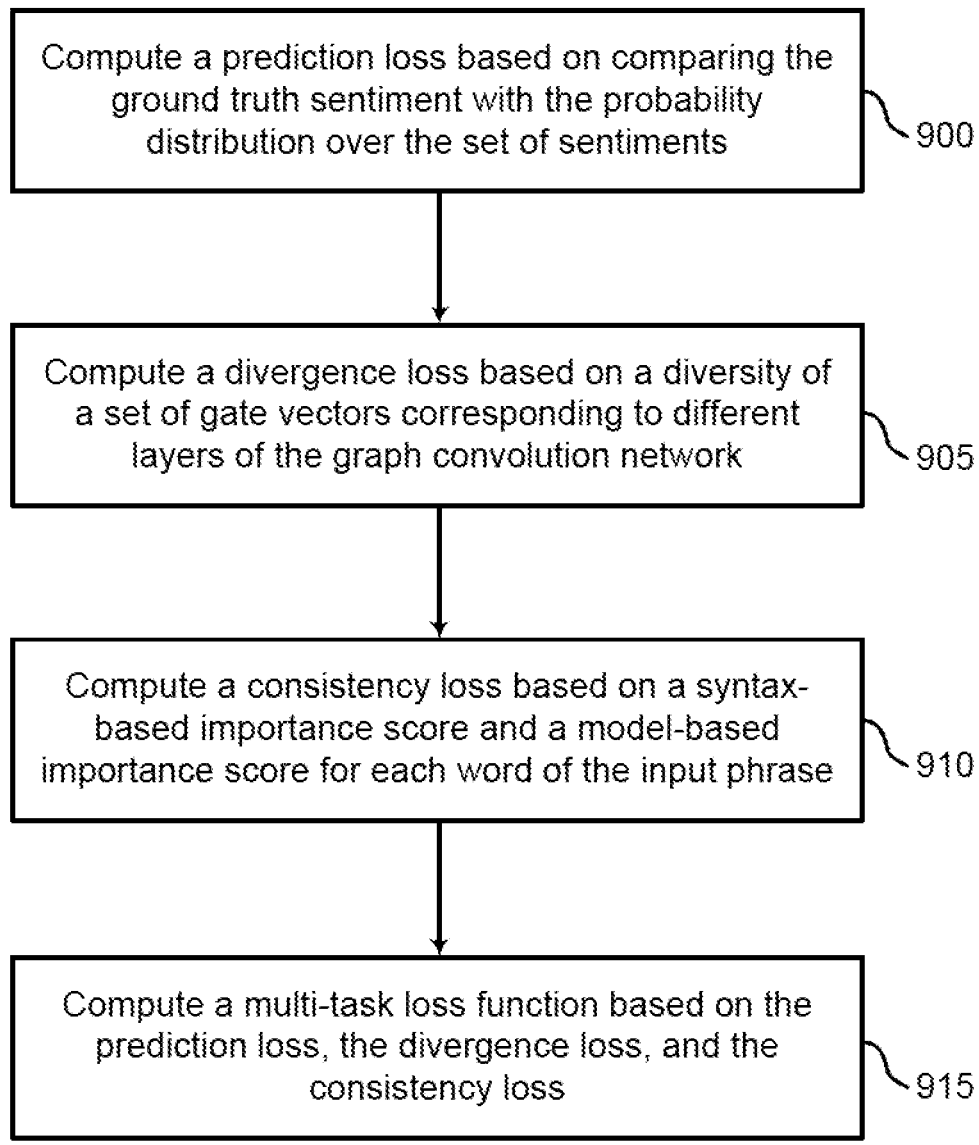
FIG. 9 shows an example of a process for generating a multi-task loss function according to aspects of the present disclosure.

In accordance with FIGS. 8-9, a method, apparatus, and non-transitory computer readable medium for training a neural network are described. One or more embodiments of the method, apparatus, and non-transitory computer readable medium include identifying a training set comprising an input phrase, an aspect term, a dependency tree, and a ground truth sentiment of the input phrase toward the aspect term, generating a gate vector based on the aspect term, generating a representation vector for the input phrase based on the dependency tree by applying the gate vector to a layer of a graph convolution network, generating a probability distribution over a plurality of sentiments based on the representation vector, computing a multi-task loss function including a prediction loss based on comparing the ground truth sentiment with the probability distribution over the plurality of sentiments, and training the graph convolution network based on the multi-task loss function.

In some examples, the prediction loss comprises a negative log likelihood of the ground truth sentiment. Some examples of the method, apparatus, and non-transitory computer readable medium described above further include computing a divergence loss based on a diversity of a plurality of gate vectors corresponding to different layers of the graph convolution network, wherein the multi-task loss function includes the divergence loss.

Some examples of the method, apparatus, and non-transitory computer readable medium described above further include multiplying a hidden vector corresponding to each word of the input phrase by each of the plurality of gate vectors to produce a plurality of regulated hidden vectors. Some examples further include combining regulated hidden vectors corresponding to each word of the input phrase to produce a hidden representation vector corresponding to each of the plurality of gate vectors. Some examples further include computing a similarity score between a hidden representation vector corresponding to the gate vector and a hidden representation vector corresponding to each of the plurality of gate vectors, wherein the divergence loss is based on the similarity score.

Some examples of the method, apparatus, and non-transitory computer readable medium described above further include computing a consistency loss based on a syntax-based importance score and a model-based importance score for each word of the input phrase, wherein the multi-task loss function includes the consistency loss.

Some examples of the method, apparatus, and non-transitory computer readable medium described above further include computing a path length between each word in the input phrase and the aspect term, wherein the syntax-based importance score is based on the path length. Some examples further include computing hidden vectors for each word of the input phrase at each layer of the graph convolution network based on the dependency tree, wherein the model-based importance score is based on the hidden vectors. Some examples further include computing a ratio between the syntax-based importance score and the model-based importance score, wherein the consistency loss is based on the ratio.

FIG. 8 shows an example of a process for training a sentiment analysis network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

One or more embodiments of the present disclosure use supervised training techniques. Supervised learning is one of three basic machine learning paradigms, alongside unsupervised learning and reinforcement learning. Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances. In other words, the learning algorithm generalizes from the training data to unseen examples.

Accordingly, during the training process, the parameters and weights of a sentiment analysis network are adjusted to increase the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

At operation 800, the system identifies a training set including an input phrase, an aspect term, a dependency tree, and a ground truth sentiment of the input phrase toward the aspect term. In some cases, the operations of this step refer to, or may be performed by, a training component as described with reference to FIG. 3. The ground truth sentiment will be compared with a predicted sentiment from the system and a multi-task loss function is measured based on the comparison. In an embodiment, a dependency parsing module (e.g., a Python natural language analysis package like Stanza) is used to build a tree structure of words from the input sentence, which represents the syntactic dependency relations between words. In some cases, the resulting tree representations follow the universal dependencies formalism.

At operation 805, the system generates a gate vector based on the aspect term. In some cases, the operations of this step refer to, or may be performed by, a graph convolution network as described with reference to FIGS. 3 and 4.

At operation 810, the system generates a representation vector for the input phrase based on the dependency tree by applying the gate vector to a layer of a graph convolution network. In some cases, the operations of this step refer to, or may be performed by, a graph convolution network as described with reference to FIGS. 3 and 4.

In some embodiments, graph-based deep learning models (GCNs) are used to exploit the overall importance of the words in the sentences that may be estimated from dependency trees for sentiment analysis. The neighbor words of the aspect terms in the dependency trees are more important for the sentiment of the terms than the other words in the sentence in graph-based models. The system is not limited to focus on syntactic neighbor words to induce representations for the aspect terms. In some embodiments, a score may be assigned for each word of the sentences that explicitly quantify the importance or contribution for sentiment prediction of the aspect terms. Overall importance scores from the dependency trees provide useful knowledge for constructing improved representation vectors of GCN.

One or more embodiments of the present disclosure incorporate knowledge from syntax-based importance scores into the graph-based models using consistency with the model-based importance scores. The network model computes a second score for each word in the sentences using representation vectors from graph-based models. The second score reflects the model perspective on the importance of the word for the sentiment of the aspect terms. Syntax-based importance scores are employed to supervise the model-based importance scores which introduce the syntactic information into the model. Model-based importance scores are computed for words in aspect-based sentiment analysis tasks if a word is more similar to the overall representation vector which predicts the sentiment for an input sentence. For example, a word would be more important for aspect-based sentiment analysis if it is more similar the overall representation vector to predict the sentiment for the input sentence in a final step of the model.

At operation 815, the system generates a probability distribution over a set of sentiments based on the representation vector. In some cases, the operations of this step refer to, or may be performed by, a decoder network as described with reference to FIGS. 3 and 4.

At operation 820, the system computes a multi-task loss function including a prediction loss based on comparing the ground truth sentiment with the probability distribution over the set of sentiments. In some cases, the operations of this step refer to, or may be performed by, a training component as described with reference to FIG. 3.

In some examples, a supervised training model may be used that includes a loss function that compares predictions of the sentiment analysis network with ground truth training data. The term loss function refers to a function that impacts how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly, and a new set of predictions are made during the next iteration.

At operation 825, the system trains the graph convolution network based on the multi-task loss function. The multi-task loss function includes a prediction loss, a divergence loss, and a consistency loss. The consistency loss is based on a syntax-based importance score and a model-based importance score for each word of the input phrase. Details regarding the multi-task loss function is described below with reference to FIG. 9. In some cases, the operations of this step refer to, or may be performed by, a training component as described with reference to FIG. 3.

FIG. 9 shows an example of a process for generating a multi-task loss function according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 900, the system computes a prediction loss based on comparing the ground truth sentiment with the probability distribution over the set of sentiments. In some embodiments, the overall representation vector, V is fed into a feed-forward neural network with a normalized exponential function (e.g., softmax) to estimate the probability distribution $P(\cdot|X, x_t)$ over the sentiments for X and $x_t$. The prediction loss is formulated as a negative log-likelihood:

$$L_{pred} = -\log P(y^*|X, x_t) \quad (6)$$

At operation 905, the system computes a divergence loss based on a diversity of a set of gate vectors corresponding to different layers of the graph convolution network.

The diversity between the gate vectors $g^l$ is increased by enforcing the distinction between $\overline{h}^l$ and $\overline{h}^{l,l'}$ for $l' \neq l$. The distinction is enforced by minimizing a cosine similarity between these vectors. The following regularization term $L_{div}$ is formulated as follows and included as part of the multi-task loss function:

$$\mathcal{L}_{div} = \frac{1}{L(L-1)} \sum_{l=1}^{L} \sum_{l'=1, l' \neq l}^{L} \overline{h}^l \cdot \overline{h}^{l,l'} \quad (7)$$

At operation 910, the system computes a consistency loss based on a syntax-based importance score and a model-based importance score for each word of the input phrase.

In some embodiments, the system takes syntax and model consistency into account. The importance scores of the words are obtained based on the dependency tree of X, and syntax-based scores are input to the GCN which increases the quality of the representation vectors. The negative of the length of a path from $x_i$ to $x_t$ in the dependency tree is used to represent syntax-based importance score $syn_i$ for $x_i \in X$ incorporating the contextual importance neighbor words of the aspect terms for aspect-based sentiment analysis. The scores $syn_i$ are normalized with the softmax function.

The sentiment analysis network incorporates syntax-based scores $syn_i$ by leveraging the hidden vectors in GCN model to compute a model-based importance score $mod_i$ for each word $x_i \in X$ (normalized with softmax). The difference in probability distribution (i.e., KL divergence) is minimized between the syntax-based scores $syn_1, \ldots, syn_n$ and the model-based scores $mod_1, \ldots, mod_n$ by adding $L_{const}$ into the overall multi-task loss function:

$$L_{const} = -syn_i \log \frac{syn_i}{mod_i} \quad (8)$$

The sentiment analysis network increases consistency between the syntax-based and model-based importance scores and facilitate incorporating the knowledge in the syntax-based scores into the representation vectors.

At operation 915, the system computes a multi-task loss function based on the prediction loss, the divergence loss, and the consistency loss. The overall loss function to train the sentiment analysis network is formulated as follows:

$$\mathcal{L} = \mathcal{L}_{div} + \alpha L_{const} + \beta L_{pred} \quad (9)$$

where $\alpha$ and $\beta$ are trade-off parameters.

Evaluation and experiments have been conducted and results demonstrate that methods and models of the present disclosure have increased performance than baseline models. One or more embodiments of the present disclosure employ multiple datasets to evaluate methods and models described above (e.g., Restaurant and Laptop adopted from SemEval 2014 Task 4 and a large-scale multi-aspect multi-sentiment, MAMS dataset). The network model hyper-parameters are fine-tuned on the development data of MAMS and the same hyper-parameters are also used for the other datasets.

The network model is compared with feature-based, deep learning and graph-based baseline models. Feature-based models apply feature engineering and support vector machines (SVM). Deep learning models are based on the sequential order of words in sentences using network architectures (e.g., CNN, LSTM, attention and gating mechanisms). The graph-based models exploit dependency trees to increase the performance of deep learning models for aspect-based sentiment analysis. The performance of the network model and baseline models are evaluated on test sets of multiple benchmark datasets. The network model outperforms these baselines over different benchmark datasets with significant performance gaps (p<0.01).

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for natural language processing, comprising:
    generating a word embedding for each word of an input phrase, wherein the input phrase indicates a sentiment toward an aspect term;
    computing a gate vector based on the aspect term;
    identifying a dependency tree representing relations between words of the input phrase;
    generating a representation vector based on the dependency tree and the word embedding using a graph convolution network, wherein the gate vector is applied to a layer of the graph convolution network; and
    generating a probability distribution over a plurality of sentiments based on the representation vector.

2. The method of claim 1, further comprising:
    generating an aspect term embedding for the aspect term; and
    weighting the aspect term embedding by a weighting parameter corresponding to the layer of the graph convolution network, wherein the gate vector is based on the weighted aspect term embedding.

3. The method of claim 1, further comprising:
    setting values of a first layer of the graph convolution network based on the word embedding.

4. The method of claim 1, further comprising:
    combining words of the input phrase with a special token to produce an input sequence, wherein the word embedding is generated based on the input sequence.

5. The method of claim 4, further comprising:
    generating a sentence embedding corresponding to the special token, wherein the representation vector is generated by combining the sentence embedding and an output of the graph convolution network.

6. The method of claim 1, further comprising:
    aggregating hidden vectors corresponding to words of the input phrase at the layer of the graph convolution network to produce a subsequent hidden vector at a subsequent layer of the graph convolution network.

7. The method of claim 6, further comprising:
combining each of the hidden vectors with the gate vector to produce a regulated hidden vector, wherein the subsequent hidden vector is based on the regulated hidden vector.

8. The method of claim 1, further comprising:
generating a plurality of gate vectors based on the aspect term, wherein each of the plurality of gate vectors corresponds to a different layer of the graph convolution network.

9. The method of claim 1, further comprising:
predicting the sentiment of the input phrase toward the aspect term based on the probability distribution.

10. An apparatus for natural language processing, comprising:
a dependency component configured to generate a dependency tree for an input phrase;
a graph convolution network configured to generate a representation vector for the input phrase based on the dependency tree, wherein the representation vector is generated by applying a gate vector representing an aspect term of the input phrase to a layer of the graph convolution network; and
a decoder network configured to generate a probability distribution over a plurality of sentiments toward the aspect term based on the representation vector.

11. The apparatus of claim 10, wherein:
the dependency component incorporates a natural language processing library.

12. The apparatus of claim 10, wherein:
the decoder network comprises a feed forward neural network with a softmax activation function.

13. The apparatus of claim 10, further comprising:
a word embedding network configured to generate a word embedding for each word of the input phrase, wherein the representation vector is generated based on the word embedding.

14. The apparatus of claim 13, wherein:
the word embedding network comprises a transformer network.

15. A method for training a neural network, comprising:
identifying a training set comprising an input phrase, an aspect term, a dependency tree, and a ground truth sentiment of the input phrase toward the aspect term;
generating a gate vector based on the aspect term;
generating a representation vector for the input phrase based on the dependency tree by applying the gate vector to a layer of a graph convolution network;
generating a probability distribution over a plurality of sentiments based on the representation vector;
computing a multi-task loss function including a prediction loss based on comparing the ground truth sentiment with the probability distribution over the plurality of sentiments; and
training the graph convolution network based on the multi-task loss function.

16. The method of claim 15, wherein:
the prediction loss comprises a negative log likelihood of the ground truth sentiment.

17. The method of claim 15, further comprising:
computing a divergence loss based on a diversity of a plurality of gate vectors corresponding to different layers of the graph convolution network, wherein the multi-task loss function includes the divergence loss.

18. The method of claim 17, further comprising:
multiplying a hidden vector corresponding to each word of the input phrase by each of the plurality of gate vectors to produce a plurality of regulated hidden vectors;
combining regulated hidden vectors corresponding to each word of the input phrase to produce a hidden representation vector corresponding to each of the plurality of gate vectors; and
computing a similarity score between a hidden representation vector corresponding to the gate vector and a hidden representation vector corresponding to each of the plurality of gate vectors, wherein the divergence loss is based on the similarity score.

19. The method of claim 15, further comprising:
computing a consistency loss based on a syntax-based importance score and a model-based importance score for each word of the input phrase, wherein the multi-task loss function includes the consistency loss.

20. The method of claim 19, further comprising:
computing a path length between each word in the input phrase and the aspect term, wherein the syntax-based importance score is based on the path length;
computing hidden vectors for each word of the input phrase at each layer of the graph convolution network based on the dependency tree, wherein the model-based importance score is based on the hidden vectors; and
computing a ratio between the syntax-based importance score and the model-based importance score, wherein the consistency loss is based on the ratio.

* * * * *